United States Patent
Jourdan et al.

(10) Patent No.: US 7,295,134 B2
(45) Date of Patent: Nov. 13, 2007

(54) TERRAIN AVOIDANCE METHOD AND DEVICE FOR AN AIRCRAFT

(75) Inventors: Christophe Jourdan, Toulouse (FR); Vincent Foucart, Ramonville Saint Agne (FR)

(73) Assignee: Airbus France, Toulouse (FR)

( * ) Notice: Subject to any disclaimer, the term of this patent is extended or adjusted under 35 U.S.C. 154(b) by 193 days.

(21) Appl. No.: 10/942,896

(22) Filed: Sep. 17, 2004

(65) Prior Publication Data

US 2005/0073440 A1 Apr. 7, 2005

(30) Foreign Application Priority Data

Sep. 18, 2003 (FR) .................................. 03 10962

(51) Int. Cl.
G08B 23/00 (2006.01)
G01C 21/00 (2006.01)

(52) U.S. Cl. ..................... 340/963; 340/961; 340/964; 340/967; 340/970; 340/945; 340/309.16; 710/200; 710/301; 710/226; 710/2; 710/4; 710/5; 710/6; 710/11; 710/14; 710/17

(58) Field of Classification Search ..................... None
See application file for complete search history.

(56) References Cited

U.S. PATENT DOCUMENTS 3,988,713 A 10/1976 Bateman

| 4,924,401 | A | * | 5/1990 | Bice et al. ..................... 701/6 |
| 5,957,412 | A | | 9/1999 | Saint Upery et al. |
| 6,088,654 | A | | 7/2000 | Lepere et al. |
| 6,963,795 | B2 | * | 11/2005 | Haissig et al. .................. 701/7 |
| 2004/0215372 | A1 | * | 10/2004 | Bateman et al. ................ 701/1 |

OTHER PUBLICATIONS

Preliminary Search Report dated Jun. 23, 2004 with English translation.

* cited by examiner

*Primary Examiner*—Julie Bichngoc Lieu
(74) *Attorney, Agent, or Firm*—Stevens, Davis, Miller & Mosher, LLP

(57) ABSTRACT

An aircraft terrain avoidance method and device may employ a collision warning section that transmits a caution signal when the aircraft risks colliding with the terrain at the end of a first predetermined period of time. A warning signal is transmitted when the aircraft risks colliding with the terrain at the end of a second predetermined period of time, which is shorter than the first predetermined period of time. A piloting system causes the aircraft to automatically climb with a first gradient corresponding to a predetermined value upon the transmission of the caution signal. An automatic pilot is engaged automatically, if currently disengaged, to force the aircraft to climb with a second gradient, corresponding to the maximum gradient possible in the current flight conditions of the aircraft, upon the transmission of the warning signal.

7 Claims, 4 Drawing Sheets

TERRAIN AVOIDANCE METHOD AND DEVICE FOR AN AIRCRAFT

FIELD OF THE INVENTION

The present invention relates to a terrain avoidance method and device for an aircraft.

BACKGROUND OF THE RELATED ART

It is known that many aircraft, in particular civil transport aircraft, are equipped with a collision warning device making it possible to transmit a warning signal in the case of risk of collision of the aircraft with the terrain. With regard to the collision warning device, it can be in particular a device of the TAWS ("Terrain Awareness and Warning System") type, of the EGPWS ("Enhanced Ground Proximity Warning System") type or of the GCAS ("Ground Collision Avoidance System") type.

Such a collision warning device is generally capable of generating two warning signals relating to different warning levels, namely a caution and a warning. Generally, a caution is transmitted about 60 seconds before a potential collision of the aircraft with the terrain, when the risk of such a collision is detected. If this collision risk is still beyond doubt about 30 seconds before the predicted impact of the aircraft with the terrain, the said warning device transmits a warning. In the case of a warning, the pilot must of course react immediately. On the other hand, in the case of a caution, the pilot or pilots are supposed to verify the reality of the potential risk of collision with the terrain and to modify his flight path, if this risk is confirmed, in such a way as to avoid such a collision, However, it can happen that the pilots do not react satisfactorily to the warning signals given by a collision warning device, at the risk of causing the destruction of the aircraft at the time of a collision with the terrain.

The patent U.S. Pat. No. 4,924,401 proposes a solution aimed at avoiding a collision of the aircraft with the terrain. This solution consists in defining a minimum altitude below which the aircraft must not descend and in piloting the aircraft automatically by means of the automatic pilot, when this minimum altitude is passed through whilst descending, in such a way as to command the aircraft to climb again and thus to prevent any collision with the terrain.

However, this known solution is above all adapted to the case where the pilot is unaware even though the aircraft is diving. Because of this, it has the disadvantage of acting very late on the flight path of the aircraft, and the action on this flight path is of course even greater because it is late. Consequently, in the case of a civil transport aircraft, this results in an uncomfortable situation and even a potential danger for the passengers.

Furthermore, the risk that this action on the flight path will not make it possible to protect the aircraft from a collision with the terrain is also high because of this late action.

SUMMARY OF THE INVENTION

The purpose of the present invention is to overcome these disadvantages. It relates to a terrain avoidance method, for an aircraft, that is particularly efficient.

For this purpose, the said method according to which there is used a collision warning device capable of transmitting:

a caution, when the aircraft risks having a collision with the terrain at the end of a first predetermined period of time if it maintains its current flight characteristics (gradient, speed, etc.); and a warning, when the aircraft risks having a collision with the terrain at the end of a second predetermined period of time if it maintains its current flight characteristics, the said second predetermined period of time being shorter than the said first predetermined period of time, is noteworthy, according to the invention, in that:

a) if the said collision warning device transmits a caution, the aircraft is automatically subjected to at least one climb command with a first gradient corresponding to a predetermined value; and b) if the said collision warning device transmits a warning, an automatic pilot of the aircraft, which is engaged automatically if it is disengaged at the time of the transmission of the said warning, automatically and exclusively forces the aircraft to climb with a second gradient corresponding to the maximum gradient possible in the current flight conditions (mass, altitude, etc.) of the aircraft.

The method according to the invention has the advantage of acting early on the flight path of the aircraft in such a way as to avoid a collision of the latter with the terrain. In fact, this method makes it possible to place the aircraft on a positive gradient (climb) as soon as a caution is transmitted even if the pilot does not react to this caution. Thus, as soon as the caution is transmitted, action is taken in such a way as to improve the situation of the aircraft with respect to the terrain by increasing its altitude (or by reducing the lowering of its altitude).

Furthermore, this action corresponds to a first gradient which is preferably moderate, generally of the order of a few degrees (for example 2°), the effect of which does not therefore reduce the comfort of the passengers.

Moreover, if the pilot does not react to a caution and/or if the climb of the aircraft initiated due to the method according to the invention following this caution is not sufficient to avoid any risk of collision with the terrain, the collision warning device transmits a warning (for example about 30 seconds before the predicted impact of the aircraft with the terrain). In a preferred embodiment, the end of a third predetermined period of time (for example 5 seconds) is awaited in order to give the pilot the possibility of carrying out an action in that time intended to avoid a collision with the terrain. If at the end of this third predetermined period of time the pilot has not taken any action aimed at avoiding the collision (or if he has not switched off the warning generated by the said collision warning device in the case in which this warning appears incorrect to him), the automatic pilot automatically initiates a climb of the aircraft at maximum gradient.

Furthermore and advantageously, in the case where the pilot carries out an action on a control device of the aircraft, in step a), the said climb command is added to the command which is generated by the said action of the pilot on the said control device.

In this way, the aircraft can be maintained in descent (negative gradient) only in the case of a voluntary and maintained action of the pilot on the control device (for example a control column). In the case of caution, the aircraft therefore has a tendency to climb, unless there is a voluntary action by the pilot in order to make it descend. Furthermore, the fact that the aircraft climbs without voluntary action by the pilot has the advantage of contributing to the pilot becoming aware of the risk of collision with the terrain (since the aircraft does not normally climb without a voluntary action by the pilot).

Furthermore and advantageously, in the case where the aircraft is climbing, in particular in the absence of any action by the pilot on a control device of the said aircraft, in step a), the said climb command is added to the gradient corresponding to that climb.

According to the invention:
when the automatic pilot is engaged at the time of the transmission of a caution, the said automatic pilot commands (by means of a first integrated function) a gradient corresponding to the said predetermined value;
when the automatic pilot is disengaged at the time of the transmission of a caution, if the aircraft comprises electrical flight controls, the gradient of the aircraft is maintained at the said predetermined value, in the absence of an action by the pilot, by a gradient calculator managing the piloting laws of the said electrical flight controls; and
in the case of an action by the pilot on a control device of the aircraft, the gradient command or instruction corresponding to that action of the pilot is added to the said predetermined value by the calculator (managing the commands generated by the actuation of the control device).

It will be noted that there is a continuity of piloting modes according to whether the automatic pilot is engaged or disengaged. This allows a consistency in the behavior of the aircraft no matter what piloting mode is chosen by the pilot.

Furthermore and advantageously, in step b), the automatic pilot forces the aircraft into a climb with a thrust generated by engines of the aircraft, corresponding to the maximum thrust possible in the current flight conditions of the aircraft.

It will be noted that the method according to the invention allows a progressive reaction according to the level of the alarm: a first moderate reaction in the case of a caution and then a sharp reaction in the case of a warning. This makes it possible to anticipate a climb as early as possible, without notably affecting the comfort of the passengers, and then to initiate a sudden climb when the latter becomes essential in order to save the aircraft from a risk of collision.

Furthermore and advantageously, in step b), the automatic pilot forces the aircraft to climb whilst maintaining the angle of incidence of the aircraft below a maximum authorized value, in relation to protection with respect to stalling.

The present invention also relates to a terrain avoidance device for an aircraft.

According to the invention, the said device of the type comprising a collision warning device capable of transmitting:
a caution, when the aircraft risks having a collision with the terrain at the end of a first predetermined period of time if it maintains its current flight characteristics; and
a warning, when the aircraft risks having a collision with the terrain at the end of a second predetermined period of time if it maintains its current flight characteristics, the said second predetermined period of time being shorter than the said first predetermined period of time,
is noteworthy in that it furthermore comprises a piloting system of the aircraft, comprising at least:
a means of piloting making it possible to subject the aircraft automatically to at least one climb command with a first gradient corresponding to a predetermined value, when the said collision warning device transmits a caution; and
an automatic pilot which is engaged automatically, if it is disengaged at the time of transmission of a warning by the said collision warning device, and which forces the aircraft, automatically and exclusively, into a climb with a second gradient corresponding to the maximum gradient possible in the current flight conditions of the aircraft, at the time of the transmission of such a warning by the said collision warning device.

Advantageously:
the said means of piloting comprises a first function which is integrated in the automatic pilot and the said first function subjects the aircraft to the said climb command, if the said automatic pilot is engaged at the time of the transmission of a caution; and/or
the said piloting system furthermore comprises at least one control device which is able to be actuated by a pilot of the aircraft, the said piloting means comprises a second function which is integrated in a calculator managing the commands generated by the actuation of the said control device, and the said second function subjects the aircraft to the said climb command if the said automatic pilot is disengaged at the time of the transmission of a caution.

BRIEF DESCRIPTION OF THE DRAWINGS

The figures of the appended drawing will give a good understanding of how the invention may be embodied. In these figures, identical references denote similar elements.

DETAILED DESCRIPTION OF THE INVENTION

Figure 1:
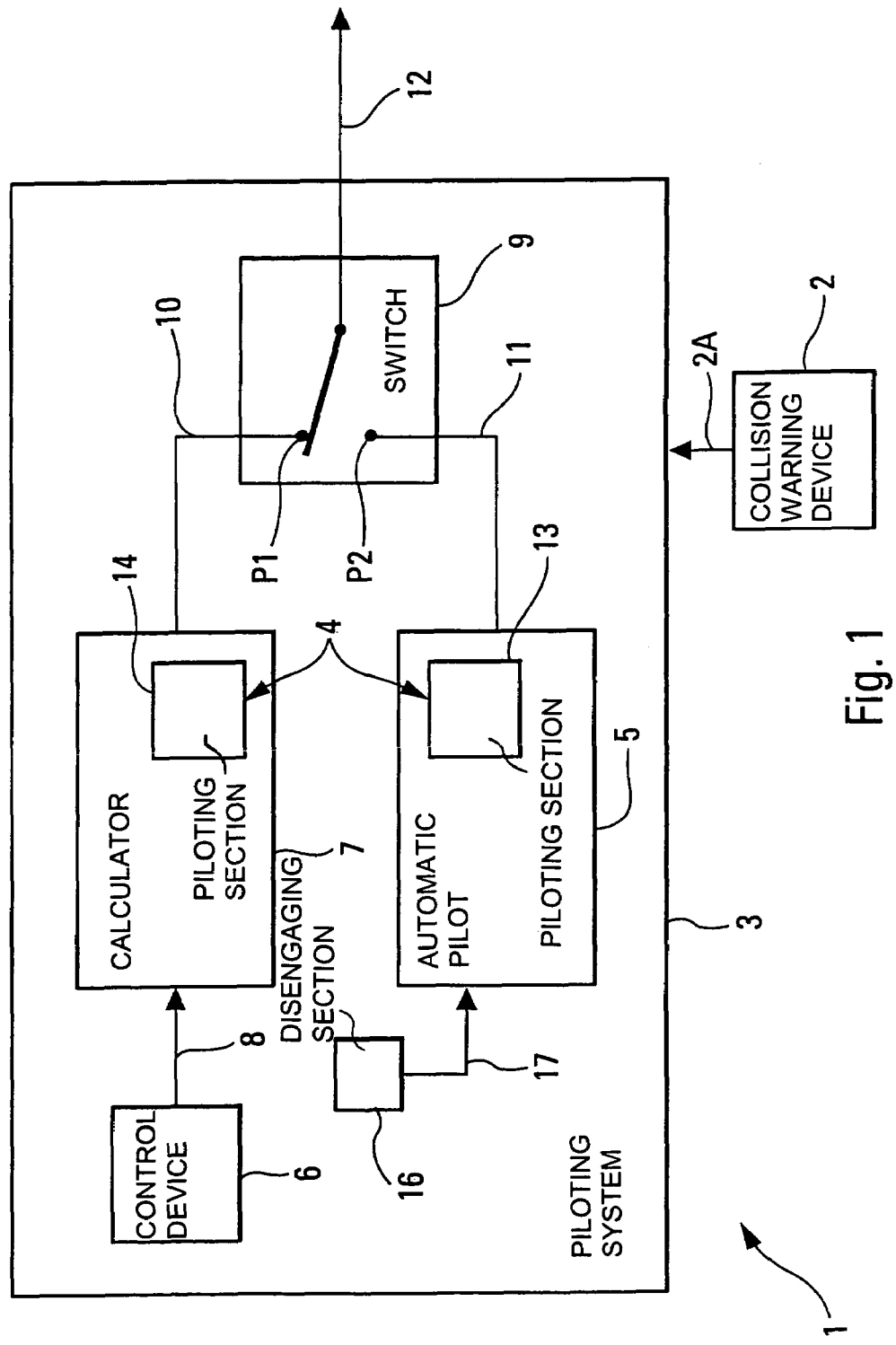
FIG. 1 is the block diagram of a terrain avoidance device according to the invention.

The device 1 according to the invention and shown diagrammatically in FIG. 1 is a terrain (or ground) S avoidance device for an aircraft A, in particular a civil transport aircraft.

According to the invention, the said device 1 comprises:
a collision warning device 2 of the usual type, which is capable of transmitting:
a caution, when the aircraft A risks having a collision with the terrain S at the end of a first predetermined period of time, for example 60 seconds, starting from the transmission of the caution, if it maintains its current flight characteristics (gradient, speed, etc.); and
a warning, when the aircraft A risks having a collision with the terrain S at the end of a second predetermined period of time, for example 30 seconds starting from the transmission of the warning, if it maintains its current flight characteristics; and
a piloting system 3 of the aircraft A, which is connected by a link 2A to the said collision warning device 2.

With regard to the collision warning device 2, it can be in particular a device of the TAWS ("Terrain Awareness and Warning System") type, of the EGPWS ("Enhanced Ground Proximity Warning System") type or of the GCAS ("Ground Collision Avoidance System") type.

Furthermore, according to the invention, the said piloting system 3 of the aircraft A comprises:
a means of piloting 4 making it possible to subject the aircraft A automatically to at least one climb command with a first moderate gradient corresponding to a predetermined value, for example 2°, when the said collision warning device transmits a caution; and an automatic pilot 5 which is engaged automatically, if it is disengaged at the time of transmission of a warning by the said collision warning device 2, and which forces the aircraft A, automatically and exclusively, into a climb with a second gradient corresponding to the maximum gradient possible in the current flight conditions (mass, altitude, etc.) of the aircraft A, at the time of the transmission of such a warning.

As shown in FIG. 1, the piloting system 3 furthermore comprises:

at least one control device 6, for example a control stick or a mini-control stick, which is able to be actuated by a pilot of the aircraft A, at least for commanding a modification of the gradient of the aircraft A;

a calculator 7 which is connected by a link 8 to the control device 6 and which is intended to manage the commands generated by the actuation of the control device 6. If the piloting system 3 is of the electrical or optical flight controls type, the said calculator 7 is a normal calculator implementing the piloting laws of the said piloting system 3; and a switching means 9 which is connected by links 10 and 11 respectively to the said calculator 7 and to the said automatic pilot 5 respectively and which, depending on the switching position P1 or P2, transmits, by the intermediary of a link 12, to normal control surfaces, that are not shown, of the aircraft A, as deflection commands for these control surfaces, either commands coming from the calculator 7, or commands coming from the automatic pilot 5.

According to the invention, the said piloting means comprise:

a first function 13 which is integrated in the automatic pilot 5. The said first function 13 subjects the aircraft A to the said climb command, if the said automatic pilot 5 is engaged at the time of the transmission of a caution; and a second function 14 which is integrated in the calculator 7 managing the commands generated by the actuation of the said control device 6. The said function 14 subjects the aircraft A to the said climb command, if the said automatic pilot 5 is disengaged at the time of the transmission of a caution.

Figure 2:
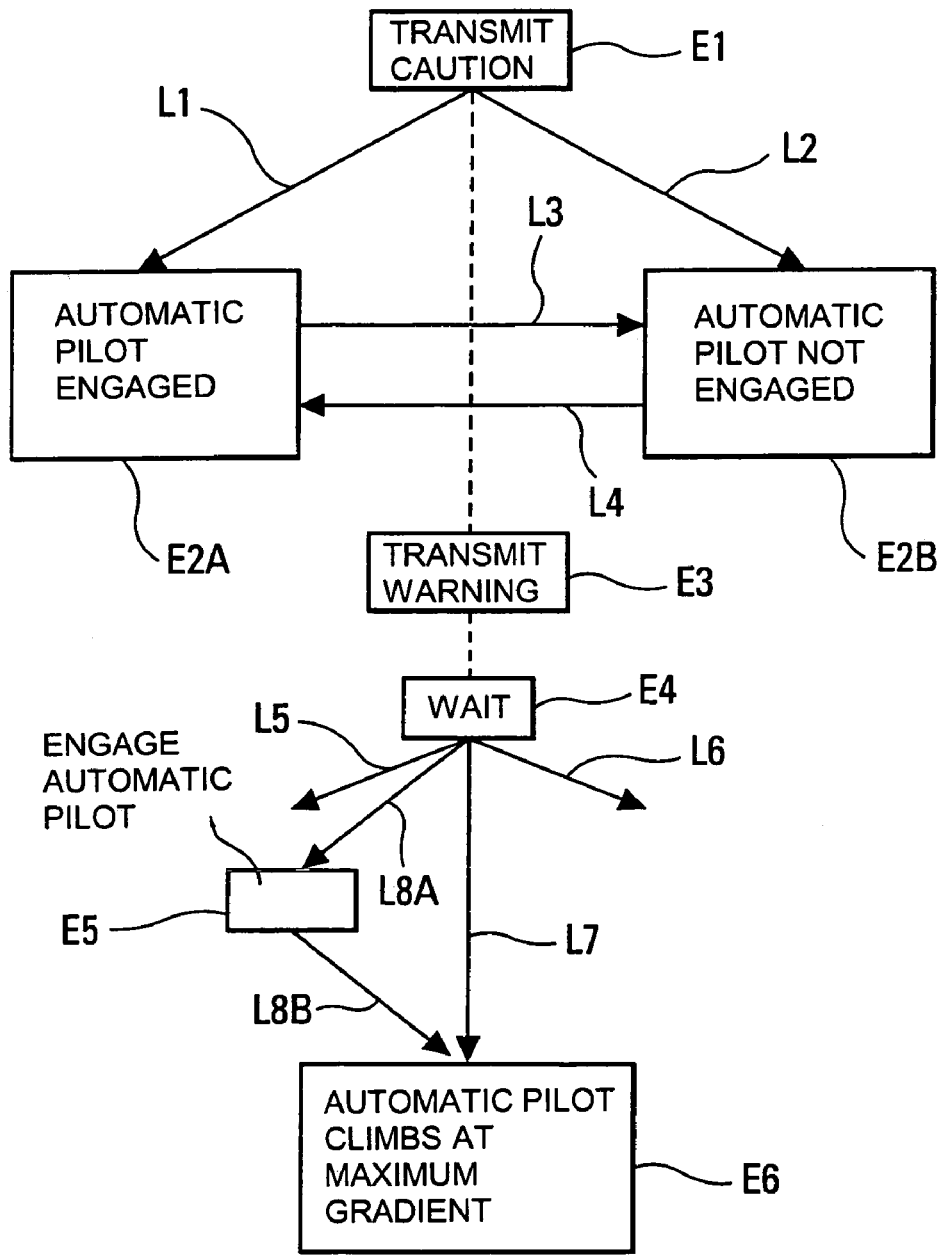
FIG. 2 is a graphical representation making it possible to describe the essential steps of a method according to the invention.

FIG. 2 is a diagrammatic representation of the method according to the invention implemented by the device 1 shown in FIG. 1.

As mentioned above, when the collision warning device 2 transmits a caution (step E1), two solutions are possible, depending on whether the automatic pilot 5 is engaged (link L1) or disengaged (link L2) at the time of the transmission of that caution.

If the automatic pilot 5 is engaged (step E2A), the automatic pilot 5 commands a gradient corresponding to the said predetermined value. On the other hand, if the automatic pilot 5 is not engaged (step E2B) and if the aircraft A comprises electrical flight controls, the gradient of the aircraft A is maintained on the said predetermined value, in the absence of an action by the pilot (on the control device 6), by the function 14 of the said calculator 7 which, in this case, manages the piloting laws of the said electrical flight controls. In this situation, a command (or a gradient instruction) corresponding to an action of the pilot on the control device 6, is added if necessary to the said predetermined value, by the said calculator 7. It will be noted that there is a continuity of piloting modes depending on whether the automatic pilot 5 is engaged or disengaged. In fact, the functions 13 and 14 implement the same type of piloting laws. This allows a consistency of behavior of the aircraft A no matter what piloting mode is chosen by the pilot.

In FIG. 2, there has been shown:

a link L3 illustrating a taking over of the control of the aircraft A by the pilot, that is to say a disengagement of the automatic pilot 5; and a link L4 illustrating an engagement by the pilot of the automatic pilot 5 (initially disengaged).

Figure 3:
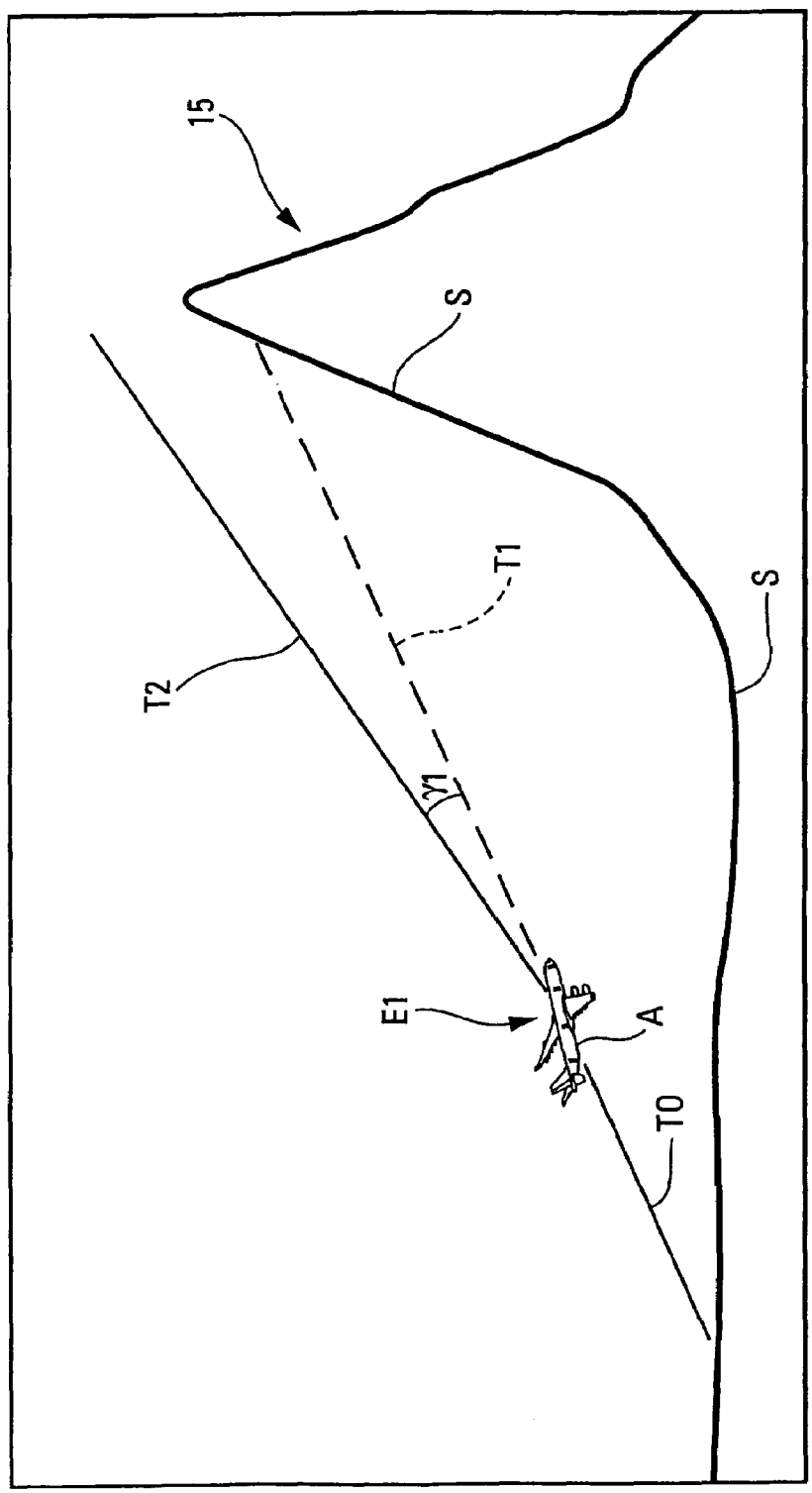
FIGS. 3 and 4 are two diagrammatic views showing two different flight situation of an aircraft, to which the method according to the invention is applied.

In FIG. 3, there has been shown an example illustrating the said steps E1, E2A and E2B. This example relates to an initial climb of the aircraft A according to a flight path T0. The aircraft A is shown at the moment of the transmission of the caution (step E1). In fact it has a risk of having a collision with the terrain S (mountain 15) if it continues its flight such as it is, as illustrated by a flight path T1 (in dashed line) extending the current flight path T0. At this moment, the device 1 subjects the aircraft A automatically to an additional climb command having a gradient $\gamma 1$ which is added to the gradient corresponding to the current flight path T0 such that the aircraft A no longer follows the flight path T1 extending the current flight path T0 but follows a flight path T2 having additional climb.

As illustrated by this example, when the pilot applies an action on the control device 6 of the aircraft A (generating the gradient of the flight path T0), the function 14 of the calculator 7 adds the said climb command (gradient $\gamma 1$) to the command which is generated by the said action of the pilot on the said control device 6.

The device 1 according to the invention has the advantage of acting early on the flight path of the aircraft A in such a way as to avoid a collision of the latter with the terrain S. In fact, the said device 1 makes it possible to place the aircraft A on a positive gradient (climb) as soon as a caution is transmitted, even if the pilot does not react to this caution. Thus, as soon as the caution is transmitted, action is taken in such a way as to improve the situation of the aircraft A with respect to the terrain S by increasing its altitude.

Furthermore, this action corresponds to a first gradient $\gamma 1$ which is preferably moderate, generally of the order of a few degrees (for example 2°), the effect of which does not therefore reduce the comfort of the passengers of the aircraft A.

It will be noted that the aircraft A can be maintained in descent (negative gradient) only in the case of a voluntary and maintained action of the pilot on the control device 6. The device 1 according to the invention is therefore advantageous in comparison with the prior art since, at the time of the transmission of a caution, the aircraft A has a tendency to climb, unless there is a voluntary action by the pilot in order to make it descend. Furthermore, the fact that the aircraft A climbs without voluntary action by the pilot has the advantage of contributing to the pilot becoming aware of the risk of collision with the terrain S (since the aircraft A does not normally climb without a voluntary action by the pilot).

Figure 4:
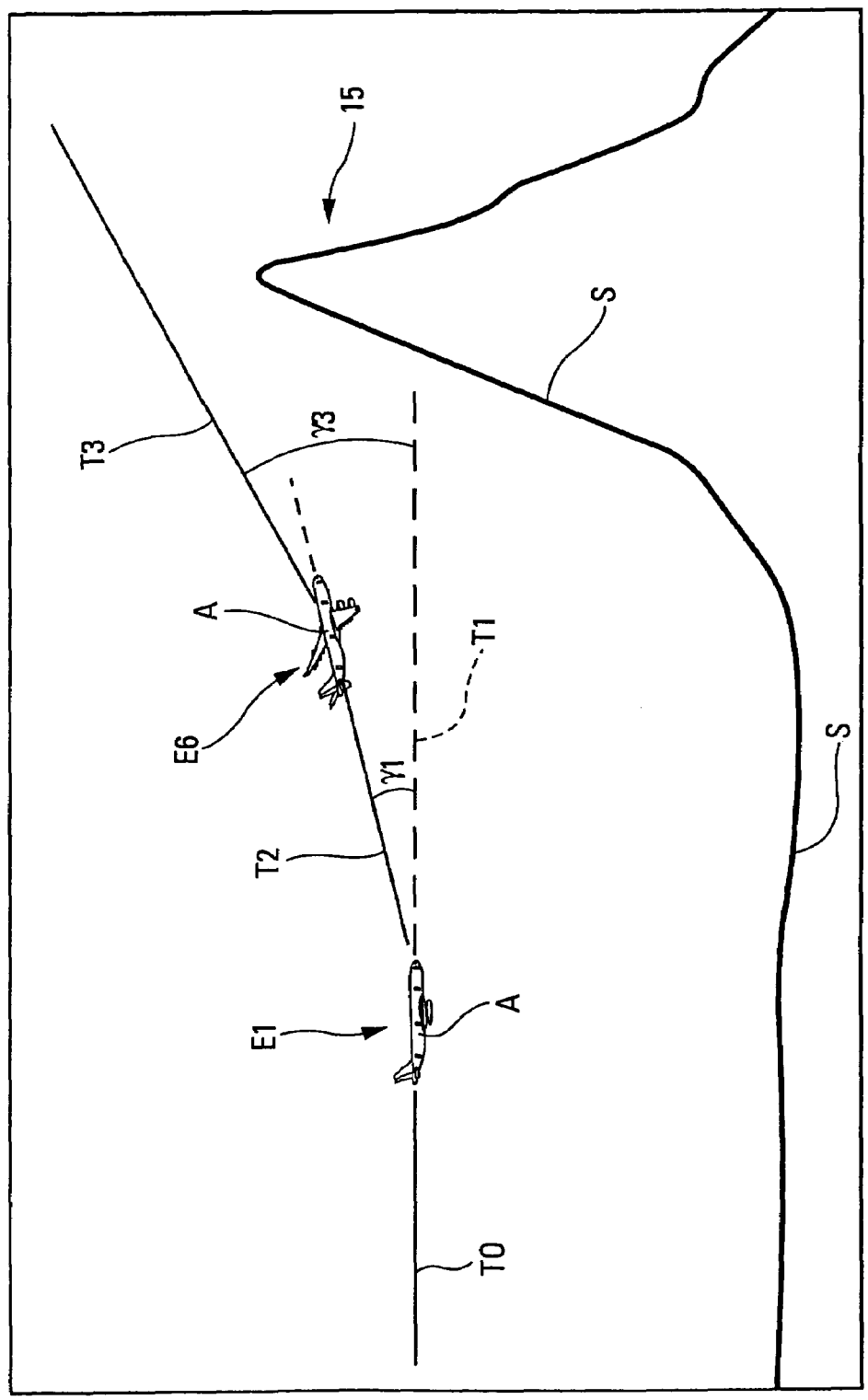

If the pilot does not react to a caution situation and/or if the climb of the aircraft A corresponding to the aforesaid step E2A, E2B is not sufficient to eliminate the risk of collision with the terrain S (as shown in FIG. 4), the collision warning device 2 transmits a warning (step E3) in the usual manner.

In this case, in a preferred embodiment, the end of a third predetermined period of time (for example 5 seconds) is awaited (step E4) in order to give the pilot the possibility of carrying out an appropriate action. The pilot can then carry out an action intended to avoid that collision (link L5), if he considers the warning to be justified. He can also cancel the warning (link L6), if he considers it to be erroneous or unjustified. If at the end of this predetermined period of time the pilot has not taken any action aimed at avoiding this collision and if he has not cancelled this warning, the automatic pilot 5 automatically forces (link L7) the aircraft to climb at maximum gradient (step E6), as previously mentioned, if it is engaged.

In the case in which it is not engaged, the automatic pilot 5 is engaged automatically (step E5, links L8A and L8B) before automatically forcing the aircraft A to climb at maximum gradient (step E6).

In FIG. 4, there has been shown an example illustrating the aforementioned steps of the method according to the invention in the particular case of level flight. Despite a climb with a gradient γ1 on transmission of a caution (step E1), the risk of collision with the terrain S (mountain 15) remains such that, in step E6, the automatic pilot performs a climb at maximum gradient γ3.

It will be noted that the device 1 according to the invention allows a progressive reaction depending on the alarm level: a first moderate reaction in the case of a caution, then a more sudden reaction in the case of a warning. This makes it possible to anticipate a climb of the aircraft A as early as possible, without notably affecting the comfort of the passengers, and then to initiate a sudden climb only when the latter becomes essential in order to save the aircraft A from a collision.

In a preferred embodiment, the automatic pilot 5 forces the aircraft A into a climb with a thrust of the engines (not shown) of the aircraft A, corresponding to the maximum thrust possible in the current flight conditions of the aircraft A.

Furthermore, according to the invention, using a usual means 16 which is connected by a link 17 to the automatic pilot 5, a pilot of the aircraft A can disengage (at any time) the automatic pilot 5, when it is engaged, and pilot the aircraft A manually.

Furthermore, according to the invention, the automatic pilot 5 forces the aircraft A to climb, whilst maintaining the angle of incidence of the aircraft A below a maximum authorized value, in relation to protection with respect to stalling.

When both of the alarms (caution and warning) become inactive, the aircraft A is returned into an operational speed range (that is to say a speed included between the minimum and maximum values selected by the pilot, given that the implementation of the method according to the invention can exceptionally result in a speed lower than the said minimum value) and into the normal functional modes (that is to say the same modes as those which follow a go-around by means of the automatic pilot 5).

The invention claimed is:

1. A terrain avoidance method for an aircraft, the method comprising:
   adding a first command corresponding to an action on a control device carried out by a pilot to a second command having a first gradient corresponding to a predetermined value so as to produce a climb command, if the aircraft's automatic pilot is disengaged;
   producing a climb command that is equivalent to the second command if the automatic pilot is engaged;
   transmitting a caution and subjecting the aircraft automatically to the climb command when the aircraft risks having a collision with the terrain at the end of a first predetermined period of time if the aircraft maintains its current flight characteristics;
   transmitting a warning when the aircraft risks having a collision with the terrain at the end of a second predetermined period of time if the aircraft maintains its current flight characteristics, the second predetermined period of time being shorter than the first predetermined period of time; and
   automatically engaging the automatic pilot at the time of transmission of the warning so as to force the aircraft into a climb with the maximum gradient possible in the current flight conditions of the aircraft, wherein:
   if the caution is transmitted when the automatic pilot is engaged, the climb command is executed by a first function integrated within the automatic pilot,
   if the caution is transmitted when the automatic pilot is disengaged, the climb command is executed by a second function without engaging the automatic pilot, and
   the first and second functions implement the same type of piloting laws.

2. The method of claim 1, wherein the automatic pilot forces the aircraft into the climb with a thrust generated by engines of the aircraft that corresponds to the maximum thrust possible in the current flight conditions of the aircraft.

3. The method of claim 1, wherein a pilot of the aircraft disengages the automatic pilot so as to pilot the aircraft manually.

4. The method of claim 1, wherein the automatic pilot forces the aircraft to climb while maintaining the angle of incidence of the aircraft below a maximum authorized value, in relation to protection with respect to stalling.

5. The method of claim 1, wherein the automatic pilot starts to force the aircraft to climb at the end of a third predetermined period of time after the transmission of the warning, if no action has previously been taken to avoid the collision with the terrain.

6. The method of claim 1, wherein the predetermined value of the first gradient is equal to 2°.

7. Terrain avoidance device for an aircraft, the device comprising a collision warning device operable to transmit:
   a caution, when the aircraft risks having a collision with the terrain at the end of a first predetermined period of time if it maintains its current flight characteristics; and
   a warning, when the aircraft risks having a collision with the terrain at the end of a second predetermined period of time if it maintains its current flight characteristics, the second predetermined period of time being shorter than the first predetermined period of time,
   wherein the terrain avoidance device furthermore comprises a piloting system of the aircraft, including:
   at least one control device, which is able to be actuated by a pilot of the aircraft;
   a calculator which manages the commands generated by the actuation of the control device;
   a piloting device that subjects the aircraft automatically to at least one climb command with a first gradient corresponding to a predetermined value, as soon as the collision warning device transmits a caution,
   wherein the piloting device comprises:
   a first function which is integrated in an automatic pilot and wherein this first function subjects the aircraft to the climb command corresponding to the predetermined value, if the automatic pilot is engaged at the time of the transmission of a caution; and
   a second function which is integrated in the calculator managing the commands generated by the actuation of the control device, wherein the second function subjects the aircraft to the climb command corresponding to the predetermined value if the automatic pilot is disengaged at the time of the transmission of a caution, wherein the first function and the second function implement the same type of piloting laws, and wherein, in the case the pilot carries out an action on the control device, the command corresponding to this action is added to the command corresponding to the predetermined value; and said automatic pilot which is engaged automatically, if it is disengaged at the time of transmission of a warning by the collision warning device, and which forces the aircraft, automatically and exclusively, into a climb with a second gradient corresponding to the maximum gradient possible in the current flight conditions of the aircraft, at the time of the transmission of such a warning by the collision warning device.

\* \* \* \* \*